United States Patent
Erlmann et al.

(10) Patent No.: US 9,838,470 B2
(45) Date of Patent: Dec. 5, 2017

(54) WRITE ACCESS TO A VARIABLE IN A SERVER

(75) Inventors: Markus Erlmann, Mainleus (DE); Christian Hock, Fuerth (DE); Frank Volkmann, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 214 days.

(21) Appl. No.: 14/416,185

(22) PCT Filed: Jul. 24, 2012

(86) PCT No.: PCT/EP2012/064457
§ 371 (c)(1),
(2), (4) Date: Jan. 21, 2015

(87) PCT Pub. No.: WO2014/015893
PCT Pub. Date: Jan. 30, 2014

(65) Prior Publication Data
US 2015/0189003 A1  Jul. 2, 2015

(51) Int. Cl.
G06F 15/16 (2006.01)
H04L 29/08 (2006.01)
H04L 29/06 (2006.01)
G06F 9/54 (2006.01)

(52) U.S. Cl.
CPC ............ *H04L 67/1002* (2013.01); *G06F 9/54* (2013.01); *H04L 67/1095* (2013.01); *H04L 67/12* (2013.01); *H04L 67/40* (2013.01); *H04L 67/42* (2013.01)

(58) Field of Classification Search
CPC ........................... H04L 67/42; H04L 67/1095

USPC .................................................. 709/219, 224
See application file for complete search history.

(56) References Cited

U.S. PATENT DOCUMENTS

| 7,779,124 B2* | 8/2010 | Huang | H04L 29/00 709/224 |
| 8,027,349 B2* | 9/2011 | Brown | G05B 19/4185 370/399 |
| 2002/0144020 A1 | 10/2002 | Gooding | |
| 2008/0114872 A1* | 5/2008 | Fisher | G05B 9/03 709/224 |
| 2008/0127186 A1* | 5/2008 | Kanodia | G05B 23/0216 718/101 |
| 2008/0161958 A1* | 7/2008 | Davidson | G01J 3/02 700/109 |
| 2008/0294771 A1* | 11/2008 | Hermes | G05B 23/0267 709/224 |

(Continued)

*Primary Examiner* — Phuoc Nguyen
(74) *Attorney, Agent, or Firm* — Cozen O'Connor

(57) ABSTRACT

A method for optimizing repeated write access by a client to at least one variable in a server via OPC UA, wherein a call method for repeated write access is provided on the server, the call method includes notification of an access time interval and at least one variable for the repeated write access, the client calls the call method on the server, the server is notified of an access time interval and the at least one variable for the repeated write access in the process, where the server creates a data structure for the repeated write access and maintains said data structure during the access time interval, values of the at least one variable which are to be written are transmitted to the server by the client during the access time interval, and the server allocates each value transmitted by the client to the associated variable.

13 Claims, 2 Drawing Sheets

(56) References Cited

U.S. PATENT DOCUMENTS

| | | | |
|---|---|---|---|
| 2008/0306313 A1* | 12/2008 | Eriksson | C07B 59/001 570/255 |
| 2010/0114994 A1* | 5/2010 | Huang | G06F 17/2247 707/811 |
| 2010/0205613 A1 | 8/2010 | Wang et al. | |
| 2011/0153087 A1* | 6/2011 | Cohen | F03G 6/067 700/275 |
| 2013/0070717 A1* | 3/2013 | Elsterer | H04L 67/12 370/329 |

* cited by examiner

WRITE ACCESS TO A VARIABLE IN A SERVER

REFERENCE TO RELATED APPLICATIONS

This is a U.S. national stage of application No. PCT/EP2012/064457 filed 24 Jul. 2012.

BACKGROUND OF THE INVENTION

Field of the Invention

The invention relates to the optimization of repeated write access by a client to at least one variable in a server via OPC Unified Architecture (OPC-UA).

OPC Unified Architecture (OPC-UA) is a communication protocol and information model for communication between different automation components (devices).

OPC-UA is subject to a strict client-server model, i.e., servers provide information that is requested from the servers by clients. Here, the communication between a client and a server is initiated by the client, i.e., always begins with the client and is therefore asymmetrical. If two components (devices) are intended to communicate with one another with equal rights (symmetrically), both must nowadays be the client and the server at the same time. There are restrictions on the transport layer, where clients and servers may be situated in the network. As a result, every client also cannot be made the server in every situation. In addition, simultaneous client and server functionality of communicating devices requires a greater outlay in terms of development and resources on both devices. This outlay is often not acceptable, particularly in the field, because the devices and networks used there are often relatively inefficient.

In the field, sensors and actuators provide process values or act on a process. These process values are provided by OPC-UA servers that are implemented in the sensors and actuators, for example. Such sensors and actuators are generally very inefficient devices, whereas those devices that receive the data from sensors or actuators are considerably more powerful than the sensors and actuators. This contradicts the general understanding of client and server whereby the server is the more powerful machine.

Different devices in a device in a network, i.e., actuators, are actuated repeatedly. Actuators, for example, cyclically receive new values from a desired value generator, and sensors continuously provide new writable values.

U.S. Pub. No. 2010/0205613 A1 discloses a method, an apparatus and a system for the temporally limited use of functions that are not temporally limited per se. Here, the functions are encapsulated in a time-limiting method adapter that can be called by a caller.

SUMMARY OF THE INVENTION

It is therefore an object of the invention to provide hardware and a method for optimizing repeated write access by a client to at least one variable in a server in a network via OPC-UA communication.

This and other objects and advantages are achieved in accordance with the invention by providing hardware and a method in which repeated write access by a client to at least one variable in a server is optimized via OPC-UA. In this case, a call method for repeated write access is provided on the server, where the call method comprises the notification of an access time interval and at least one variable for the repeated write access. The client calls the call method on the server and the server is notified of an access time interval and the at least one variable for the repeated write access in the process. The server creates a data structure for the repeated write access after the call method has been called by the client and maintains the data structure during the access time interval. Values of the at least one variable that are to be written are transmitted to the server by the client during the access time interval. The server allocates each value transmitted by the client to the associated variable via the data structure.

Here and below, a variable in a server is understood as meaning a variable that is stored as an OPC-UA node in an address space of the server. Furthermore, here and below, a server is always understood as meaning an OPC-UA server and a client is always understood as meaning an OPC-UA client.

In accordance with the invention, the server therefore provides a data structure for a client, which data structure can be used by the client to repeatedly write values of one or more variables in the server after it has registered with the server for this purpose by calling a corresponding call method. Here, the call method is used to stipulate which variable or variables can be written in this manner and for which length of time this is possible.

As a result, in contrast to a conventional OPC-UA, when repeatedly writing or changing the value of a variable, the server does not need to set up a new data structure for each write access by the client, which data structure is eliminated again after the write access. This relieves the load on the server because there is no need to set up and eliminate a separate data structure for each write access for stipulating the affected variables, attributes of these variables and quality of the attributes, and therefore increases the achievable throughput rate of the server. In particular, this advantageously relieves the load on inefficient servers that are implemented in sensors or actuators of a network, for example.

The method in accordance with the invention therefore supplements the conventional OPC-UA with a structure that can be interpreted as a write subscription. Conventional OPC-UA subscriptions make it possible for a client to register with a server for the purpose of repeatedly reading values of a set of variables, where the client is notified of value changes of these variables by the server after the client has been registered. The method in accordance with the invention provides an analogous write subscription that can be used by a client to write and change values of one or more variables in a server during a definable access time interval.

In one preferred embodiment of the invention, the data structure created by the server is deleted after expiry of the access time interval. As a result, the storage space used for the data structure is advantageously made available again after the data structure is no longer required.

In another preferred embodiment of the invention, the server allocates a unique identification number to the data structure and the server notifies the client of this identification number.

As a result, the client is advantageously informed of the creation and availability of the data structure, with the result that the client knows that it is possible to write value changes of variables and knows from when it can be done. The identification number advantageously makes it possible to uniquely identify the created data structure which can be used by the client and server during further communication.

In another preferred embodiment of the invention, the server transmits a write message to the client each time a value of the at least one variable is written to notify the client of the writing of the value. As a result, the client is advantageously notified of a value change of a desired variable. In particular, the client knows, from the absence of a write message, that a value change desired by him possibly has not been performed, with the result that it is possible to re-transmit the desired value change to the server.

It is also an object of the invention to provide hardware that is configured to perform the method in accordance with the invention and therefore to make it possible to achieve the abovementioned advantages of this method.

A client in accordance with the invention is accordingly configured to call the call method for repeated write access on the server and therefore to notify the server of an access time interval and the at least one variable for the repeated write access and to transmit values of the at least one variable that are to be written to the server during the access time interval.

A server in accordance with the invention is configured to provide the call method for repeated write access, to create a data structure for the repeated write access after the call method has been called by the client and to maintain the data structure during the access time interval and to write the values of the at least one variable that are to be written and have been transmitted by the client via the data structure.

In preferred embodiments of the invention, the server is configured to delete the data structure created by it after expiry of the access time interval and/or to allocate a unique identification number to the data structure and to notify the client of this identification number and/or to transmit a write message to the client each time a value of the at least one variable is written in order to notify the client of the writing of the value.

A network in accordance with the invention comprises at least one client in accordance with the invention and at least one server in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved become clearer and more distinctly comprehensible in connection with the following description of exemplary embodiments which are explained in more detail in connection with the drawings, in which.

DETAILED DESCRIPTION OF THE EXEMPLARY EMBODIMENTS

Mutually corresponding parts are provided with the same reference symbols in all figures.

Figure 1:
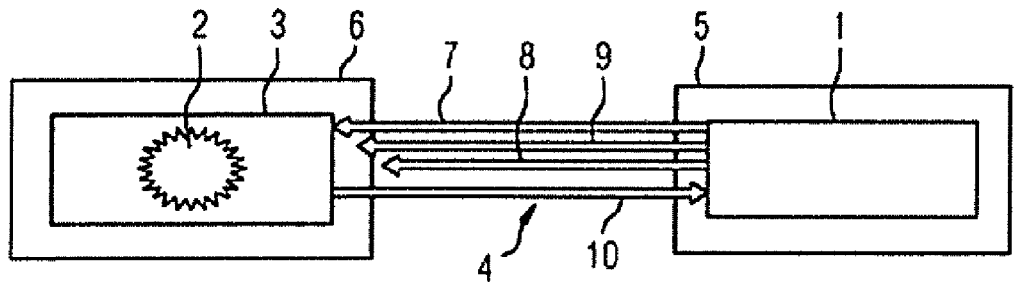
FIG. 1 schematically shows repeated OPC-UA write access by a client to a variable in a server in accordance with the prior art.

FIG. 1 schematically shows repeated OPC-UA write access by a client 1 to a variable 2 in a server 3 in accordance with the prior art. In this case, the client 1 is implemented in a first device 5 in a network 4. The server 3 is implemented in a second device 6 in the network 4.

For example, the second device 6 is an actuator, such as a motor, and the first device 5 is a desired value generator for the actuator or a gateway that receives desired values for the actuator, such as desired axis angles, via the network 4 and forwards them to the actuator.

The value of the variable 2 is the desired value that is changed by the client 1 via the repeated OPC-UA write access. For this purpose, the client 1 transmits a separate OPC-UA write request 7, 8, 9 to the server 3 for each desired value change. The write requests 7, 8, 9 are processed independently of one another by the server 3. For each write request 7, 8, 9, the client 1 therefore sets up the entire write context again, including the determination of the variable 2, attributes and quality of the attributes, and transmits it to the server 3. The write requests 7, 8, 9 are received by the server 3 and are evaluated independently of one another to allocate the value change to the variable 2.

The second device 6 also notifies the first device 5 of actual values using a conventional OPC-UA subscription 10 of the client 1 with the server 3. In the example considered above, in which the second device 6 is a motor, a possible actual value is an instantaneous axis angle of the motor, for example. Here, each actual value is stored in a further variable (not illustrated here), for which the client 1 is registered using the OPC-UA subscription 10 and the value changes of which are communicated to the client 1 by the server 3 as part of the OPC-UA subscription 10.

The constant re-set up of OPC-UA write accesses by the client 1 to the variable 2 in the server 3 considerably burdens the client 1 and the server 3 and reduces the possible data throughput rates.

Figure 2:
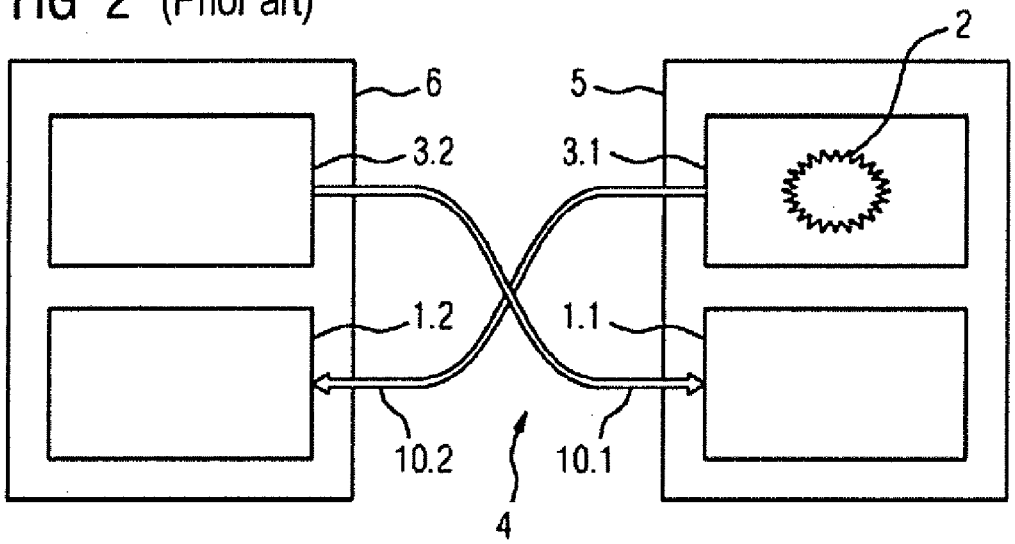
FIG. 2 schematically shows two devices which communicate with one another using OPC-UA subscriptions in accordance with the prior art.

FIG. 2 schematically shows a second possibility for the two devices 5, 6 illustrated in FIG. 1 to interchange and update desired and actual values in accordance with the prior art using conventional OPC-UA in the network 4. For this purpose, a first client 1.1 and a first server 3.1 are implemented in the first device 5 and a second client 1.2 and a second server 3.2 are implemented in the second device 6. Similarly to the example shown in FIG. 1, the current actual values here are transmitted from the second device 6 to the first device 5 using a first conventional OPC-UA subscription 10.1 of the first client 1.1 with the second server 3.2. However, the first device 5 notifies the second device 6 of desired value changes using a second conventional OPC-UA subscription 10.2, with which the second client 1.2 is registered for the variable 2 in the first server 3.1. Although this interchange of changes of the actual and desired values between the devices 5, 6 avoids the continuous re-setup of OPC-UA write accesses, as in the example shown in FIG. 1, this instead requires a client 1.1, 1.2 and a server 3.1, 3.2 to be implemented in each of the two devices 5, 6. However, such simultaneous client and server functionality is complicated and cannot be achieved for each network device for reasons already mentioned above.

Figure 3:
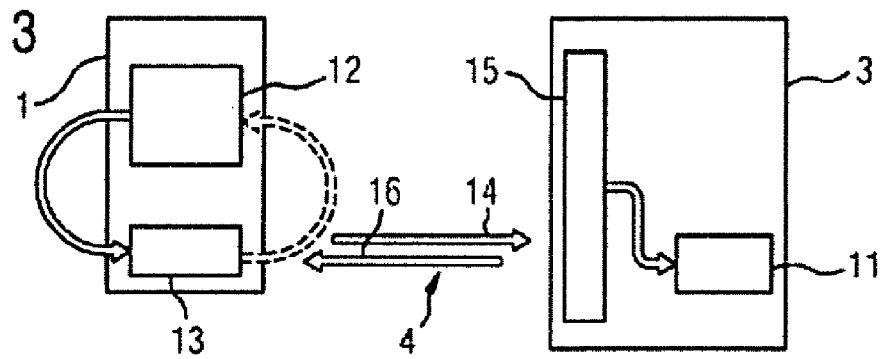
FIG. 3 schematically shows the generation of a data structure for the repeated write access by a client to a variable in a server in accordance with the invention.
Figure 4:
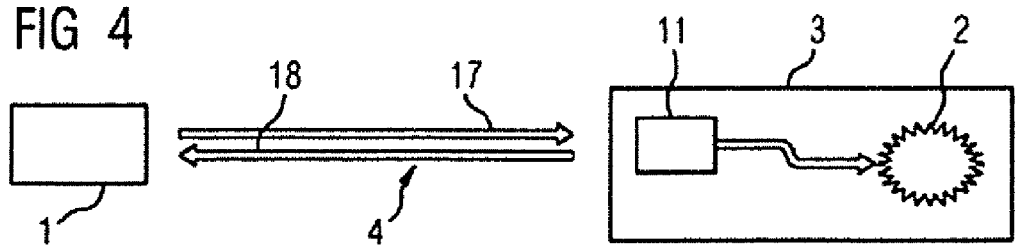
FIG. 4 schematically shows repeated write access by a client to a variable in a server in accordance with the invention.

FIGS. 3 and 4 show repeated write access by a client 1 to a variable 2 in a server 3 in a network 4 using OPC-UA in accordance with the invention.

FIG. 3 schematically shows the generation of a data structure 11 for the repeated write access by the client 1 to the variable 2 in the server 3. A CreateWriteSubscription call method for repeated write access is provided on the server 3. The call method comprises the notification of an access time interval and at least one variable 2 for the repeated write access.

An application 12 in the client 1, which wants write access to the variable 2 during an access time interval, such as 250 ms, notifies a client OPC-UA communication stack 13 of the client 1 of this desire. The client OPC-UA communication stack 13 then generates a corresponding call message 14 containing the call CreateWriteSubscription (2, 250 ms) and transmits this call message 14 to the server 3 via the network 4.

A server OPC-UA communication stack 15 of the server 3 receives the call message 14. The server 3 then creates the data structure 11 for the repeated write access to the variable 2 for the client 1, allocates a unique identification number to the data structure 11 and maintains the data structure 11 during the access time interval. After the data structure 11 has been created, the server OPC-UA communication stack 15 generates a create message 16, which contains the identification number of the data structure 11 and confirms the creation of the data structure 11, and transmits the create message 16 to the client 1 via the network 4 to notify the client 1 of the creation of the data structure 11 and its identification number.

The client OPC-UA communication stack 13 receives the create message 16 and notifies the application 12 in the client 1 of the identification number of the data structure 11.

FIG. 4 schematically shows repeated write access by the client 1 to the variable 2 in the server 3 in accordance with the invention.

In order to change the value of the variable 2 during the access time interval, the client 1 transmits a value change message 17 to the server 3 via the network 4, where the value change message contains the identification number of the data structure 11 and the new value of the variable 2. The server 3 then allocates the new value to the variable 2 and transmits a write message 18 to the client 1, where the write message confirms that the value change has been made.

In contrast to conventional repeated OPC-UA write accesses described using FIG. 1, the data structure 11 is created only once and is used for each value change of the variable 2 that occurs during the access time interval. For this purpose, the devices 5, 6 involved do not need to have both client and server functionality as in the example described using FIG. 2.

The data structure 11 resembles a conventional OPC-UA subscription 10 according to the OPC-UA specification with the difference that it makes it possible for the client 1 to have repeated write access, rather than read access, to the variable 2. The data structure 11 can therefore be interpreted and referred to as a write subscription.

In this case, the CreateWriteSubscription call method corresponds to the CreateSubscription method for generating a conventional OPC-UA subscription 10. The create message 16 corresponds to a CreateSubscription-Response of a conventional OPC-UA subscription 10. A value change message 17 corresponds to a Publish-Request of a conventional OPC-UA subscription 10 with the difference that the value change message 17 already contains the changed value of the variable 2. A write message 18 corresponds to a Publish-Response of a conventional OPC-UA subscription 10 with the difference that the write message 18 contains only status information, but not the changed value of the variable 2.

Although the invention has been more specifically illustrated and described in detail by means of a preferred exemplary embodiment, the invention is not restricted by the disclosed examples and other variations can be derived therefrom by a person skilled in the art without departing from the scope of protection of the invention.

Figure 5:
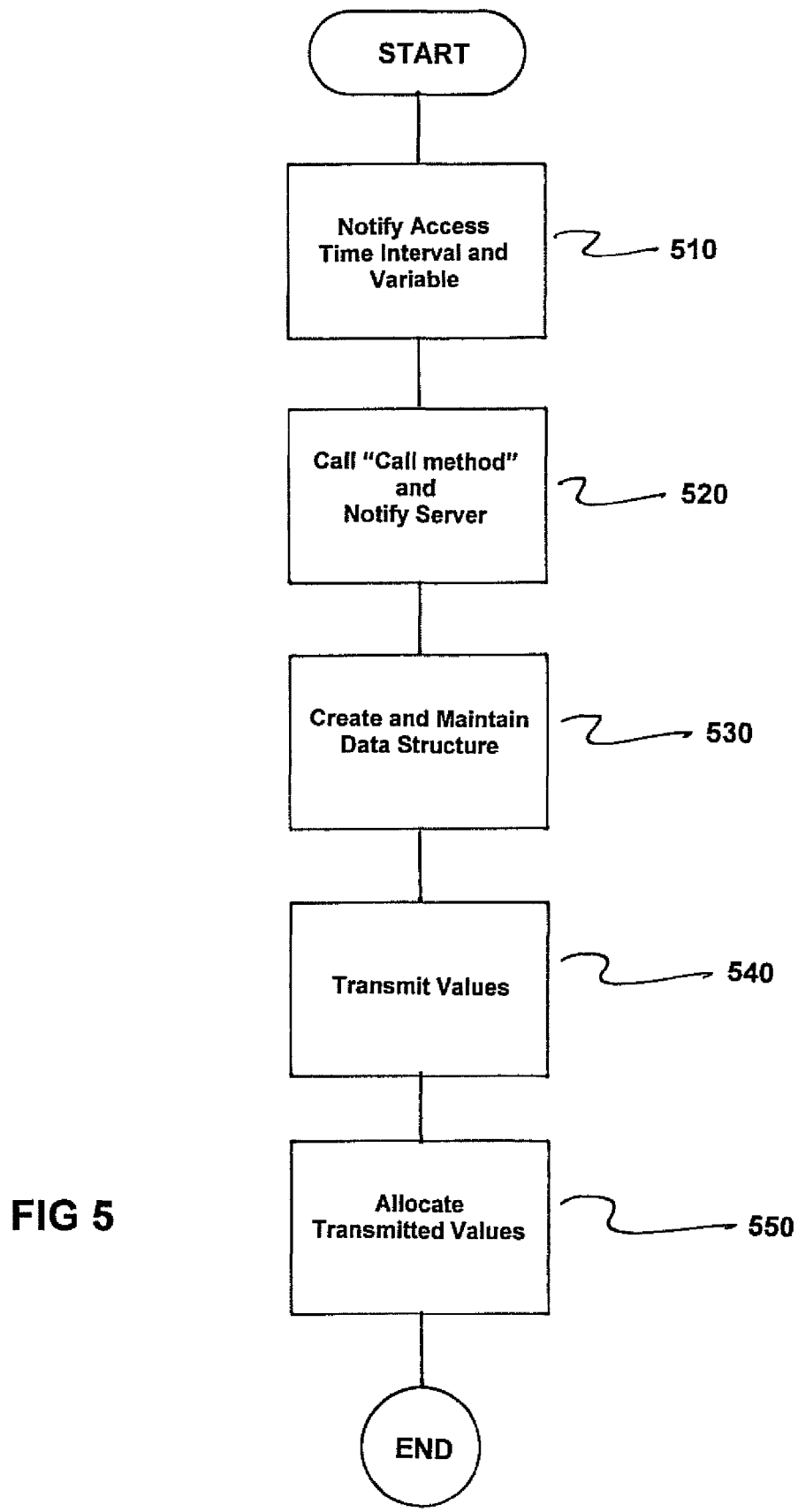
FIG. 5 is a flowchart of the method in accordance with the invention.

FIG. 5 is a flowchart of a method for optimizing repeated write access by a client (1, 1.1, 1.2) to at least one variable (2) in a server (3, 3.1, 3.2) via OPC Unified Architecture (OPC-UA). The method comprises providing a call method for repeated write access on the server (3, 3.1, 3.2), as indicated in step 510. Here, the call method comprises notification of an access time interval and at least one variable (2) for the repeated write access. The method additionally comprise calling, by the client (1, 1.1, 1.2), the call method on the server (3, 3.1, 3.2) and notifying the server (3, 3.1, 3.2) of an access time interval and the at least one variable (2) for the repeated write access, as indicated in step 520.

The method also includes creating, by the server (3, 3.1, 3.2), a data structure (11) for the repeated write access after the call method has been called by the client (1, 1.1, 1.2) and maintaining the data structure during the access time interval, as indicated in step 530.

Values of the at least one variable (2) which are to be written to the server (3, 3.1, 3.2) during the access time interval are now transmitted by the client (1, 1.1, 1.2), as indicated in step 530.

Each value transmitted by the client (1, 1.1, 1.2) is then allocated by the server (3, 3.1, 3.2) to the associated variable (2) via the data structure (11), as indicated in step 540.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for optimizing repeated OPC Unified Architecture (OPC-UA) write access by a client to at least one variable in a server via OPC-UA, the method comprising:
   providing a call method for repeated OPC-UA write access on the server, the call method comprising notification of an access time interval and at least one variable for the repeated OPC-UA write access;
   calling, by the client, the call method on the server and notifying the server of an access time interval and the at least one variable for the repeated OPC-UA write access;

creating, by the server, a data structure comprising an OPC-UA subscription for the repeated OPC-UA write access after the call method has been called by the client and maintaining the data structure comprising the OPC-UA subscription during the access time interval;

transmitting, by the client, values of the at least one variable which are to be written to the server during the access time interval; and allocating, by the server, each value transmitted by the client to the associated variable via the data structure comprising the OPC-UA subscription.

2. The method as claimed in claim 1, further comprising:
deleting the data structure comprising the OPC-UA subscription created by the server after expiry of the access time interval.

3. The method as claimed in claim 1, wherein the server allocates a unique identification number to the data structure comprising the OPC-UA subscription and the server notifies the client of this identification number.

4. The method as claimed in claim 1, wherein the server transmits a write message to the client each time a value of the at least one variable is written to notify the client of the writing of the value.

5. A client for optimizing repeated OPC Unified Architecture (OPC-UA) write access to at least one variable in a server via OPC-UA, wherein the client is configured to call a call method for the repeated OPC-UA write access on the server and therefore to notify the server of an access time interval and the at least one variable for the repeated OPC-UA write access and to transmit values of the at least one variable which are to be written to the server during the access time interval.

6. A server for optimizing repeated OPC Unified Architecture (OPC-UA) write access by a client to at least one variable in the server via OPC-UA, wherein the server is configured to provide a call method for the repeated write access, create a data structure comprising an OPC-UA subscription for the repeated OPC-UA write access after the call method has been called by the client and to maintain said data structure comprising the OPC-UA subscription during an access time interval and to write the values of the at least one variable which are to be written and have been transmitted by the client via data structure comprising the OPC-UA subscription.

7. The server as claimed in claim 6, wherein the server is further configured to delete the data structure comprising the OPC-UA subscription created by said server after expiry of the access time interval.

8. The server as claimed in claim 7, wherein the server is configured to allocate a unique identification number to the data structure comprising the OPC-UA subscription and to notify the client of this identification number.

9. The server as claimed in claim 7, wherein the server is further configured to transmit a write message to the client each time a value of the at least one variable is written to confirm writing of the value to the client.

10. The server as claimed in claim 6, wherein the server is configured to allocate a unique identification number to the data structure comprising the OPC-UA subscription and to notify the client of this identification number.

11. The server as claimed in claim 10, wherein the server is further configured to transmit a write message to the client each time a value of the at least one variable is written to confirm writing of the value to the client.

12. The server as claimed in claim 6, wherein the server is further configured to transmit a write message to the client each time a value of the at least one variable is written to confirm writing of the value to the client.

13. A network optimizing repeated OPC Unified Architecture (OPC-UA) write access by a client to at least one variable in a server via OPC-UA, comprising:

at least one client configured to call a call method for the repeated OPC-UA write access on the server and therefore to notify the server of an access time interval and the at least one variable for the repeated OPC-UA write access and to transmit values of the at least one variable which are to be written to the server during the access time interval; and at least one server configured to provide a call method for the repeated OPC-UA write access, create a data structure comprising an OPC-UA subscription for the repeated OPC-UA write access after the call method has been called by the client and to maintain said data structure comprising the OPC-UA subscription during an access time interval and to write the values of the at least one variable which are to be written and have been transmitted by the client via the data structure comprising the OPC-UA subscription.

* * * * *